United States Patent

Beaulieu et al.

[15] 3,662,284
[45] May 9, 1972

[54] DOUBLE DISCHARGE LASER

[72] Inventors: Alexandre J. Beaulieu; Albert Laflamme, both of Ste. Foy, Quebec, Canada

[73] Assignee: Her Majesty the Queen in right of Canada represented by the Minister of National Defence of Her Majesty's Canadian Government

[22] Filed: Aug. 20, 1970

[21] Appl. No.: 65,588

[30] Foreign Application Priority Data

Aug. 29, 1969 Canada..................................60,715

[52] U.S. Cl..............................................331/94.5, 313/198
[51] Int. Cl................................................................H01s 3/09
[58] Field of Search..........................331/94.5; 313/197, 198

[56] References Cited

UNITED STATES PATENTS

| | | | |
|---|---|---|---|
| 3,363,196 | 1/1968 | Eknayan | 331/94.5 |
| 3,402,367 | 9/1968 | Kobayashi | 331/94.5 |
| 3,477,098 | 5/1969 | Eckberg | 331/94.5 |
| 3,555,451 | 1/1971 | Witte et al. | 331/94.5 |
| 3,403,353 | 9/1968 | Lamb, Jr. et al. | 331/94.5 |
| 3,562,664 | 2/1971 | Rigelen et al. | 331/94.5 |

OTHER PUBLICATIONS

Sedgwick et al.: " Low Voltage Carbon Dioxide Laser Excitation," Applied Optics, Vol. 9, pp. 2737- 2741, Dec. 1970
Laflamme: " Double Discharge Excitation for Atmospheric Pressure Carbon Dioxide Lasers," The Review of Scientific Instruments, Vol. 41, pp. 1578- 1581 Nov. 1970

Primary Examiner—Ronald L. Wibert
Assistant Examiner—Edward S. Bauer
Attorney—Cushman, Darby & Cushman

[57] ABSTRACT

A transverse excitation system is disclosed in which a preliminary discharge between an auxiliary electrode and a main electrode is initiated prior to initiation of the main discharge. The preliminary discharge ionizes the gas adjacent the main electrode and reduces the probability of the onset of bright arc discharge, thus enhancing the efficiency of gas excitation.

4 Claims, 5 Drawing Figures

PATENTED MAY 9 1972 3,662,284

DOUBLE DISCHARGE LASER

The present invention relates to a transverse excitation system for a high pressure molecular gas laser.

In the companion application (Resistorless Electrode Structure) Ser. No. 67,074 filed Aug. 26, 1970 there is disclosed a plurality of electrode structures for the direct excitation of a molecular gas laser in which a shower discharge occurs between a pair of electrodes in a lasing gas, and means are provided to prevent the establishment of bright arcs. With such an electrode structure, when the width of the electrodes transverse to the direction of laser operation is increased, instabilities arise which enhance the preferential establishment of random bright arcs between the electrode structures. Thus, when it is attempted to energize a large volume of laser gas utilizing a shower discharge between electrodes of substantial dimensions in the direction transverse to the axis of the laser, there is a tendency to randomly generate bright arcs between the electrodes which draw all of the current between the electrodes and extinguish the shower discharge.

In attempting to achieve a higher volume excitation, some means must be provided to prevent random arcing at one point or another between the electrodes of the system. The present invention provides a solution to this problem which substantially prevents random arcing and maintains the highly desirable shower discharge between the electrodes of the system. In accordance with the present invention, it has been found that if a third electrode is positioned adjacent to one of the two main electrodes of the structure and a discharge initiated between the third electrode and the adjacent main electrode, it is possible to ionize the gas in the immediate vicinity of this main discharge electrode. Subsequently, when a discharge occurs between the two main discharge electrodes, there is little or no tendency for bright arc discharge to occur. It would appear that if the gas adjacent to one of the main discharge electrodes can be ionized at the time that high voltage is applied between the main discharge electrodes, a stable shower discharge can be maintained between the main electrodes, and probability of the onset of the highly undesirable bright arc discharge can be reduced substantially.

Various theories have been advanced to explain this phenomenon.

The theoretical hypothesis which has led to the development of the present invention is that the formation of bright arcs is a chance-phenomena associated with the statistical distribution of charged particles (electrons or ions) in the gas between the electrodes at the time of application of the voltage pulse, the multiple discharge paths of the shower each corresponding to at least one charged particle being present at the time of application of the voltage pulse. The growth rate of the filamentary discharges of the shower is related to the number of initial charged particles in each filament. The fastest growing filament discharge then turns into a bright arc which extinguishes all other filaments and destroys the uniformity of the excitation over the laser cavity length. This explains the observed phenomena that increasing the discharge area increases the probability of generating bright arcs. The addition of a trigger electrode creates an earlier discharge than the main excitation, producing a large number of charged particles for the initiation of the main discharge. Thus, a larger number of discharge filaments are formed, and their growth rates are more nearly equal, due to the more equal charged particle densities, reducing further the probability of the formation of bright arcs.

However, it should be recognized that the present application is not to be considered limited to one particular theory of operation since further research may determine that the original theories do not properly explain the phenomena observed.

The excitation energy increase obtained with the double discharge system of the present invention is a 10 time increase over the energy which can be utilized with resistorless electrodes of large active areas as described in the said copending application to excite a laser gap in the absence of the double discharge system. The laser power output is correspondingly increased by an order of magnitude when the excitation energy is increased.

In the accompanying drawings which illustrate embodiments of the present invention and its manner of operation:

Figure 1:
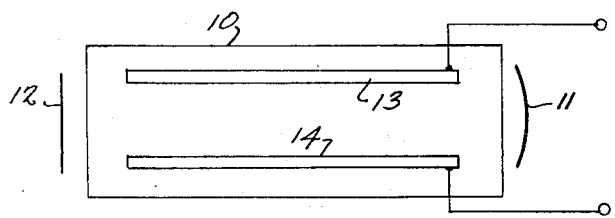
FIG. 1 is a sketch of a molecular gas laser.

Referring to FIG. 1, there is illustrated a molecular gas laser in which the double discharge electrode structure of the present invention may be utilized. Such a system has been disclosed, for example, in the prior U.S. application of Jacques Beaulieu, Ser. No. 731,693 filed May 24, 1968. This structure may include a lasing chamber 10 containing a suitable molecular gas laser mixture, a curved mirror 11, and a partially reflecting plane mirror 12. An electrode structure consisting of electrodes 13 and 14 is provided in the laser cavity 10, these electrodes being connected to terminals to which high voltage direct current pulses are applied.

Figure 2:
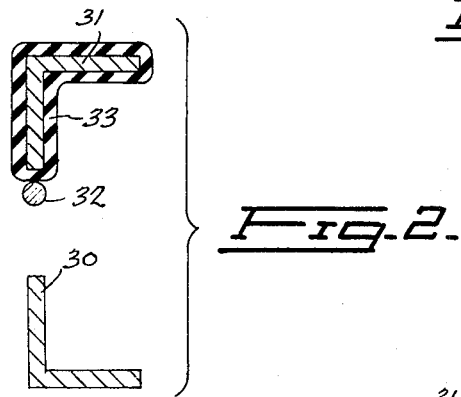
FIG. 2 is a cross section of one embodiment of electrode structure in accordance with the present invention.
Figure 3:
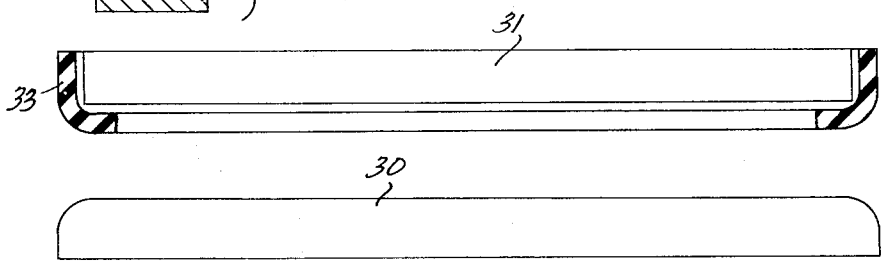
FIG. 3 is a longitudinal view of the structure of FIG. 2.

The first embodiment of the trigger principle is illustrated in FIGS. 2 and 3. Using two angle bars 30 and 31 as electrode structures, a wire 32 was stretched close to the edge of one of these bars but insulated from it. The lower bar 30 acted as the cathode; the stretched wire 32 was used as the anode of the main discharge system. This system operated with the second bar 31 disconnected electrically provided the electrical energy was not too large. Connecting a small capacitor between upper bar 31 and and the cathode 30 gave rise to the generation of a triggering discharge. This enabled the discharge energy to be increased many times without the formation of bright arcs, and laser output also increased proportionally. The addition of an insulator 33 between trigger electrode 31 and wire 32 improved the performance as it led to a more uniform trigger discharge.

Figure 4:
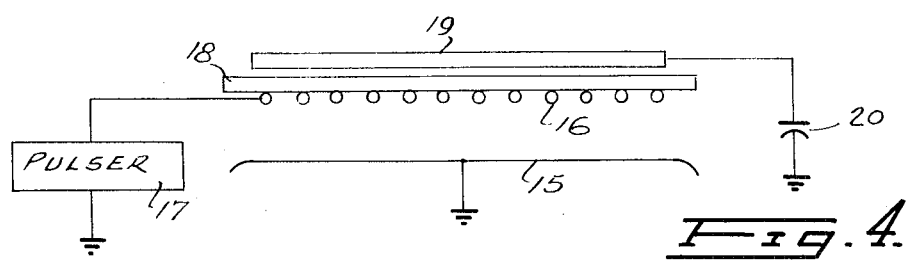
FIG. 4 is an electrical schematic of a double discharge system in accordance with the present invention.

FIG. 4 is a schematic drawing illustrating one form of double discharge electrode structure pursuant to the present invention. A cathode 15 is connected to ground, and an anode 16 in the form of a metallic grid is connected to the ungrounded terminal of the pulser 17. A layer of insulation 18 is positioned behind said anode 16 and in intimate contact with the back thereof. An additional electrode 19 hereinafter referred to as a trigger electrode is positioned behind the insulator 18 and is connected to ground through a small value capacitor 20. It will be appreciated that the electrode structure illustrated in FIG. 4 is contained within a laser cavity and that the electrode structure is immersed in a laser gas mixture.

In operation the double discharge electrode structure of FIG. 4 results in the ionization of the molecular laser gas adjacent the grid or anode 16, and when the voltage between the anode 16 and the cathode 15 reaches a high value, a shower discharge between the anode 16 and cathode 15 occurs which is very uniform and results in the energization of a substantial volume of the laser gas. Output pulses of the order of 3 to 4 joules per meter of laser length have been obtained utilizing such an electrode structure with an active cross section of approximately 10 cm$^2$.

The solid insulation 18 provided between the trigger 19 and the grid 16 simplifies the construction as well as provides a more uniform glow since less energy is consumed in the primary discharge if the anode and trigger are very close.

Figure 5:
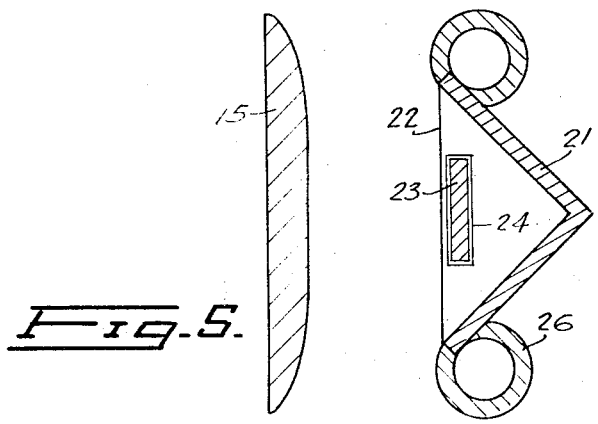
FIG. 5 is a cross section through a preferred form of electrode structure for use in accordance with the present invention.

Various configurations have been utilized for the anode and the trigger structure of the present invention, and a typical embodiment is illustrated in FIG. 5. FIG. 5 is a transverse cross section through an embodiment of an electrode system in accordance with the invention utilizing a shaped cathode 15 whose shape is determined by potential gradient considerations as discussed in the companion application (Resistorless Electrode Structure). The anode structure of FIG. 5 comprises an aluminum angle 21 on which is wrapped a wire grid 22. Behind the grid, an aluminum trigger bar 23 is positioned. Although not essential, it is preferable to put an insulating film on the trigger bar. Such an insulator may for example be a heat shrinkable plastic film 24, such as nylon. Segments of aluminum tubing 25 and 26 are fixed to the aluminum angle 21 to decrease the potential gradient at the ends of the angle. In an operating embodiment of the present invention, the grid 22 was wound of No.22 wire, 10 turns per inch, the aluminum angle was 2 × 2 inches aluminum angle, and the trigger bar 23 was approximately 1 × ¼ inch with a 20-gauge heat shrinkable insulation applied to it. With such a structure approximately 1 meter in length, a laser power output of the order of 4 joules per pulse was obtained at a pulse repetition rate of approximately 1 pulse per second (this repetition being limited by the available power supply).

It will be recognized by those skilled in the art that the grid 22 could be replaced, for example with a wire mesh, provided that the mesh was sufficiently transparent to the ionization of the primary discharge to provide the required layer of ionized gas on the surface of the mesh adjacent to cathode 15. It will also be appreciated that alternative structures of the anode and trigger could be constructed, for example the anode could be in the form of a threaded rod with the trigger being an insulated wire wrapped in the roots of the thread of the bar.

We claim

1. A transverse excitation system for a high pressure molecular gas laser having a resonant cavity, a pair of main discharge electrodes extending longitudinally of said laser cavity, means including an auxiliary electrode adjacent one of said main discharge electrodes for developing a capacitance between said auxiliary electrode and the main electrode not adjacent said auxiliary electrode, and means comprising a high voltage pulser connected between said main discharge electrodes and further comprising said capacitance developing means to initiate a discharge between said auxiliary electrode and said adjacent main discharge electrode to ionize the gas in the immediate vicinity of said adjacent main discharge electrode prior to initiation of a discharge between said main discharge electrodes.

2. A laser excitation system as defined in claim 1 wherein said capacitance developing means comprises a capacitor.

3. A system as defined in claim 1 wherein said auxiliary electrode is positioned on the side of said adjacent main electrode remote from the other main electrode, and said adjacent main electrode is provided with openings whereby said ionized gas in the immediate vicinity of said adjacent main electrode extends into the region between said main electrodes.

4. A system as defined in claim 3 wherein said main electrode adjacent said auxiliary electrode comprises a grid, and said auxiliary electrode is a solid bar insulated from said grid by a solid insulation.

* * * * *